United States Patent
Koutsos et al.

(10) Patent No.: US 11,547,886 B2
(45) Date of Patent: Jan. 10, 2023

(54) AUTOMATIC VALVE

(71) Applicant: REACTON FIRE SUPPRESSION LTD, Chelmsford (GB)

(72) Inventors: Theodoros Koutsos, Chelmsford (GB); Edward Michael John Barnes, Chelmsford (GB)

(73) Assignee: REACTON FIRE SUPPRESSION LTD, Chelmsford (GB)

( * ) Notice: Subject to any disclaimer, the term of this patent is extended or adjusted under 35 U.S.C. 154(b) by 113 days.

(21) Appl. No.: 16/603,153

(22) PCT Filed: Apr. 4, 2018

(86) PCT No.: PCT/GB2018/050911
§ 371 (c)(1),
(2) Date: Oct. 4, 2019

(87) PCT Pub. No.: WO2018/185484
PCT Pub. Date: Oct. 11, 2018

(65) Prior Publication Data
US 2020/0114186 A1    Apr. 16, 2020

(30) Foreign Application Priority Data

Apr. 4, 2017  (GB) .................................... 1705415
Nov. 10, 2017 (GB) .................................... 1718605

(51) Int. Cl.
*A62C 35/68*   (2006.01)
*A62C 37/36*   (2006.01)
*F16K 31/122*  (2006.01)

(52) U.S. Cl.
CPC .............. *A62C 35/68* (2013.01); *A62C 37/36* (2013.01); *F16K 31/1223* (2013.01)

(58) Field of Classification Search
CPC ...... A62C 35/68; A62C 37/36; F16K 31/1223
(Continued)

(56) References Cited

U.S. PATENT DOCUMENTS 3,651,823 A   3/1972  Milsted, Sr.
3,744,506 A   7/1973  Milsted, Sr.
(Continued)

FOREIGN PATENT DOCUMENTS

CN   202859971 U   4/2013
GB   2 438 370 A  11/2007
(Continued)

OTHER PUBLICATIONS

Sep. 14, 2018 Search Report issued in International Patent Application No. PCT/GB2018/050911.
(Continued)

*Primary Examiner* — Christopher S Kim
(74) *Attorney, Agent, or Firm* — Maier & Maier, PLLC (57) ABSTRACT

An automatic valve includes a body configured to receive a piston axially therein, the piston being movable within the body between a first axial position in which the piston is configured to seal a valve opening when pneumatic pressure is applied to the piston and a second axial position in which the piston is configured to be withdrawn from the valve opening such that a fire suppression agent can enter the valve body through the valve opening, wherein the piston includes a channel longitudinally therethrough and a check valve positioned within the channel such that fluid can enter the check valve in a first longitudinal direction but not in a second longitudinal direction.

16 Claims, 6 Drawing Sheets

(58) Field of Classification Search
USPC .............................................. 169/19, 20, 22
See application file for complete search history.

(56) References Cited

U.S. PATENT DOCUMENTS

| | | | |
|---|---|---|---|
| 3,860,073 A | 1/1975 | Willms | |
| 2005/0011552 A1 | 1/2005 | Sundholm et al. | |
| 2012/0152571 A1 | 6/2012 | Andreas | |
| 2013/0306333 A1* | 11/2013 | Ringer .................. | F16K 31/122 169/17 |
| 2016/0339282 A1 | 11/2016 | Melton | |

FOREIGN PATENT DOCUMENTS

| | | |
|---|---|---|
| GB | 2 439 338 A | 12/2007 |
| GB | 2 509 074 A | 6/2014 |
| GB | 2 512 485 A | 10/2014 |
| WO | 2006/130363 A2 | 12/2006 |

OTHER PUBLICATIONS

Sep. 14, 2018 Written Opinion of the International Searching Authority issued in International Patent Application No. PCT/GB2018/050911.

Aug. 7, 2017 Search Report issued in British Patent Application No. GB1705415.6.

May 10, 2018 Search Report issued in British Patent Application No. GB1718605.7.

* cited by examiner

AUTOMATIC VALVE

FIELD

The present invention relates to an automatic valve particularly, but not exclusively, for use in conjunction with a fire suppression system.

BACKGROUND

Fire suppression systems can either be manually or automatically activated. An example of an automatic system is a sprinkler system that is activated in response to detection of heat. The system is defined by a network of water pipes suspended from the ceiling of a building interspersed by a plurality of sprinkler heads. Each sprinkler head has a plug which is designed to burst or melt in response to application of heat. In this way, the system is effective at dousing a localised fire by way of activation of one, or a few sprinkler heads, or a larger fire through activation of multiple sprinkler heads.

Sprinkler systems typically use water as medium but water is not appropriate for fighting all types of fire. In the event of an electrical fire, application of water to the fire would potentially cause the fire to spread further. Furthermore, a sprinkler head is only activated following heating of the temperature sensitive plug by hot gases generated in the event of a fire. The hot gases would therefore have to be relatively localised in order to activate a sprinkler head thus potentially resulting in a delay between a fire taking hold and activation of the fire suppression system.

For applications such as electrical cabinets where it is desirable to directly target a point of ignition, systems that provide a direct path inside the electrical cabinet are known. Such systems use a heat sensitive tube which is designed to burst when it reaches a certain temperature. When the tube bursts, a fire suppression agent is dispersed directly from the point of burst onto the affected area of the electrical cabinet thus addressing the source of heat directly.

An example of a larger system where use of water might not be desirable is a pneumatic system that utilises a run of heat sensitive tube in the vicinity of equipment to be protected. The tubing is connected to a cylinder containing a fire suppression agent. When the tubing bursts, the system loses pressure and causes the cylinder to deliver a fire suppression agent to a plurality of valves that are not directly connected to the tubing. The pressure of the agent causes a cap to blow off each valve so that the fire suppression medium can be delivered to the source of the fire. Such systems are effective at fighting a fire in either a specific area or over a broader area but the response time can be diminished by the system first having to detect that pressure has been lost due to burst tubing before delivering a fire suppression agent through a separate tube or pipe network to the heat sensitive tubing.

Some pneumatic systems also provide a manual actuator which causes pneumatic pressure in the system to drop when actuated. A manual actuator provides means for an operator to quickly deploy the fire suppression system in the event of a fire rather than waiting for the temperature sensitive tubing to burst.

The present invention seeks to address the aforementioned problems.

SUMMARY OF THE INVENTION

An aspect of the invention provides an automatic valve comprising a body configured to receive a piston axially therein, the piston being movable within the body between a first axial position in which the piston is configured to seal a valve opening when pneumatic pressure is applied to the piston and a second axial position in which the piston is configured to be withdrawn from the valve opening such that a fire suppression agent can enter the valve body through the valve opening.

The present invention provides a means of automatically activating a fire suppression system in the event of a fire in the vicinity of one or more automatic valves. Pneumatic pressure is used to urge a piston in a downwards axial configuration in order to seal a valve opening during normal operation.

In the event of detection of a fire or abnormal heating, the pneumatic pressure holding the piston down is removed and the piston is urged upwardly by pressurised fire suppression agent forcing its way through the valve opening and overcoming the pressure differential that is provided by the pneumatic pressure acting on the piston. This configuration provides a quick response time following detection of a fire and provides a reliable means of automatically deploying a fire suppression agent.

In one embodiment of the invention, the piston comprises a channel longitudinally therethrough and a check valve positioned within the channel such that fluid can enter the check valve in a first longitudinal direction but not in a second longitudinal direction.

Provision of a check valve in a channel through the piston eliminates cross-contamination of medium between the discharge and detection lines of a fire suppression system as can occur in the prior art. Furthermore, the check valve minimises pressure loss of the fire suppression system caused by leakage of medium past the piston. Use of a check valve also enables a larger diameter channel through the piston to be used to facilitate efficient charging of the automatic valve than is possible in the prior art. For example, many prior art valves use a channel having an opening diameter of 0.5 mm in communication with a 2 mm diameter shaft, or less, to reduce pressure loss through the valve.

The present embodiment of the invention can use a much greater diameter opening fitted with a check valve. Fluid can only pass through the check valve in a single direction into the 2 mm diameter channel, or shaft. Such a configuration results in a calibrated leak rate of only 20 sccm.

In one embodiment the body comprises a first part for receiving the piston therein and a second part, the second part comprising a connector for connecting the body to an air source.

Manufacture of the automatic valve in two parts is advantageous in order to aid assembly of the valve in such a way that the piston can be axially restrained therein.

In one embodiment the first part of the body comprises a first threaded portion and the second part of the body comprises a second threaded portion co-operable with the first threaded portion.

Connecting the first part of the body and the second part of the body via a threaded connection enables the body to be easily disassembled during servicing or replacement.

In one embodiment the first threaded portion defines a male thread and the second threaded portion defines a female thread.

Such a configuration ensures that the thread is effectively an internal thread with no access to the environment. This is advantageous as many items of equipment are used in hostile environments which might see a range of temperatures and humidity or debris particles that could clog an external thread. Use of an internal thread reduces the possibility of damage to the threads.

In one embodiment the first part of the body defines a cylindrical chamber.

Use of a cylindrical chamber is advantageous so as to provide a curved internal surface that co-operates with a lubricated o-ring around the piston. Avoidance of angled axial surfaces is desirable to aid axial movement of the piston relative to the body.

In one embodiment the second part of the body defines an attachment interface co-operable with a tool.

In use, the first part of the body will be fastened to a pipe network and air source. The design of an automatic isolation valve according to embodiments of the invention is such that the second part of the body can be detached from the first part of the body to access the piston while the first part of the body remains in place. Provision of an attachment interface co-operable with a tool is thus desirable to facilitate removal and replacement of the second part of the body.

In one embodiment the piston comprises first and second abutment surfaces engageable with the body to constrain axial movement of the piston.

Movement of the piston requires limiting axially to ensure that it can only move as far as is necessary to perform its desired function, i.e. 13.3 mm in the illustrated embodiments.

In one embodiment the second part of the body further comprises a third abutment surface engageable with the first abutment surface of the piston when the piston is in the second axial position.

Such a configuration ensures that the piston can only ever be a maximum pre-determined distance away from the mechanical isolation switch when pneumatic pressure is activated. This is important as the greater distance the piston has to travel towards the mechanical isolation switch the higher the risk of the valve failing. Limiting the distance that the piston is required to travel to within known tolerances negates this risk.

In one embodiment the first part of the body further comprises a fourth abutment surface engageable with the second abutment surface of the piston when the piston is in the first axial position.

Provision of the abutment surface between the first part of the body and the piston effectively provides a secure seat against which the piston is urged when pneumatic pressure is applied.

In one embodiment the piston further comprises an annular recess between the first and second abutment surfaces, the annular recess configured to receive an annular seal.

The annular recess provides a seat for an annular seal that provides one of three seals between the piston and the body to prevent leakage of air from the chamber defined by the body.

In one embodiment the valve comprises a first seal received in the annular recess of the piston configured to provide a seal between the piston and the first part of the body, a second seal received by the shaft of the piston configured to provide a seal between the second abutment surface of the piston and the fourth abutment surface of the first part of the body and a third seal between the first part of the body and the second part of the body configured to provide a seal therebetween.

The first and second seals provide seals between the piston and the body to prevent leakage of air and thus unplanned activation of the valve. The third seal provides a seal between the two parts of the body for the same purpose.

Each potential leak path is sealed by at least a dual seal arrangement to reduce the risk of air leakage as far as is possible.

Another aspect of the invention provides a fire suppression system comprising one or more automatic valves, a temperature sensitive detection means for detecting the presence of a fire or abnormal heat, a pneumatic air source for maintaining each of the one or more automatic valves in a normal operating condition and a fire suppression agent source connected to each of the one or more automatic valves, wherein detection of a fire or abnormal heat by the temperature sensitive detection means automatically causes pneumatic pressure to the one or more automatic valves to be removed and removal of the pneumatic pressure enables fire suppression agent from the fire suppression agent source to enter the one or more automatic valves through the first valve opening and disperse from the one or more automatic valves through the second valve opening.

FIGURES

The invention will now be described by way of reference to the following figures.

DESCRIPTION

The figures show various views of an automatic valve 10 according to embodiments of the invention. In use, the automatic valve 10 is connected to a fire suppression system that comprises multiple automatic valves connected by burst tubing and pipework for delivering a fire suppression agent.

The automatic valve 10 comprises a body 12 formed from a first part 14 and a second part 16. The first part of the body 12 defines a first end 14a and a second end 14b. The first end 14a is defined by an internal female thread 14c and is tapered to aid alignment of the second part 16 of the body 12 with the first part 14 of the body 12. The second end 14b defines an outer male thread 14d configured for mounting the automatic valve to a fire suppression system and first opening 14i configured for connecting pipework to the automatic valve 10. At least two further openings 14f, 14g are provided at the second end 14b of the first part 14 of the body 12 arranged perpendicularly to the first outlet 14i.

Internally, the first part 14 of the body 12 defines a machined chamber 14h for receiving a piston 18. An annular projection 14g defines a seat against which the piston 18 abuts when the automatic valve 10 is in a normal operating condition, i,e. the piston 18 is urged downwardly by pneumatic pressure.

The second part 16 of the body 12 comprises a male threaded portion 16a that is configured to screw into the internal female thread 14c of the first part 14 of the body 12 and a machined portion 16b configured for engagement with a tool to rotate the second part 16 of the body 12 relative to the first part 14 of the body 12. A seal 20 is provided on the threaded portion 16a to provide a seal between the threaded portion 16a and the internal female thread 14c. The machined portion 16b comprises diametrically opposed flat spots for engagement with a spanner. The second part 16 of the body 12 further comprises an axial air port 16c therethrough which is internally threaded to receive a connector (not shown) for connecting the second part 14 of the body 12 to an air source. The underside 16d of the threaded portion 16a of the second part 16 of the body 12 defines an abutment surface configured for abutment with a portion of the piston 18 as will be described further below.

The piston 18 comprises a primary cylindrical shaft 18a and a secondary cylindrical shaft 18b separated by a machined flange 18c including a planar upper and lower face, each defining a respective abutment surface 18d, 18e, and an annular recess 18f configured to receive a seal 22 for providing a seal between the machined flange 18c and the first part 14 of the body 12. Certain embodiments of the inventions comprise a channel 18g provided longitudinally through the piston 18 to enable charging of the automatic valve 10. The channel 18g has a diameter of between 0.5 mm to 2 mm. Certain embodiments of the invention also comprise a check valve 28 positioned in the channel 18g, as shown in the figures. The channel 18g has an opening that has a greater diameter than the rest of the channel 18g and within which the check valve 28 is situated.

The check valve 28, or non-return valve, operates to only enable fluids (i.e. liquids or gases) to pass through the check valve 28 in one direction. The check valve 28 has both an inlet port 28a and an outlet port 28b which are operable automatically without any manual intervention. Fluid intended to pass through the check valve 28 is required to exceed a predetermined pressure, or cracking pressure, for the inlet port 28a and/or outlet port 28b to open.

To charge the automatic valve 10, the fire suppression medium is injected through the check valve 28 into the channel 18g to fill the void 14h present when the piston 18 is positioned in its lowermost axial position with respect to the body 12. Once charged, any leakage of fire suppression medium through the piston 18 is negligible, i.e. around 20 sccm.

The abutment surface 18d of the machined flange 18c of the piston 18 abuts the abutment surface 16d of the second part 16 of the body 12 when the piston is positioned in its uppermost axial positon with respect to the body 12. The abutment surface 18e of the machined flange 18c of the piston 18 abuts the uppermost surface of the annular projection 14g of the second part 14 of the body 12 when the piston 18 is in its lowermost axial position with respect to the body 12. A further seal 24 is provided on the primary shaft 18a of the piston 18 and provides a seal between the primary shaft 18a of the piston 18 and the first opening 14i of the second part 14 of the body 12. An o'ring 26 is provided on or around the secondary cylindrical shaft 18b of the piston 18. The o'ring 26 seals between the secondary cylindrical shaft 18b of the piston 18 and the axial air port 16c of the second part 16 of the body 12.

Figure 1A:
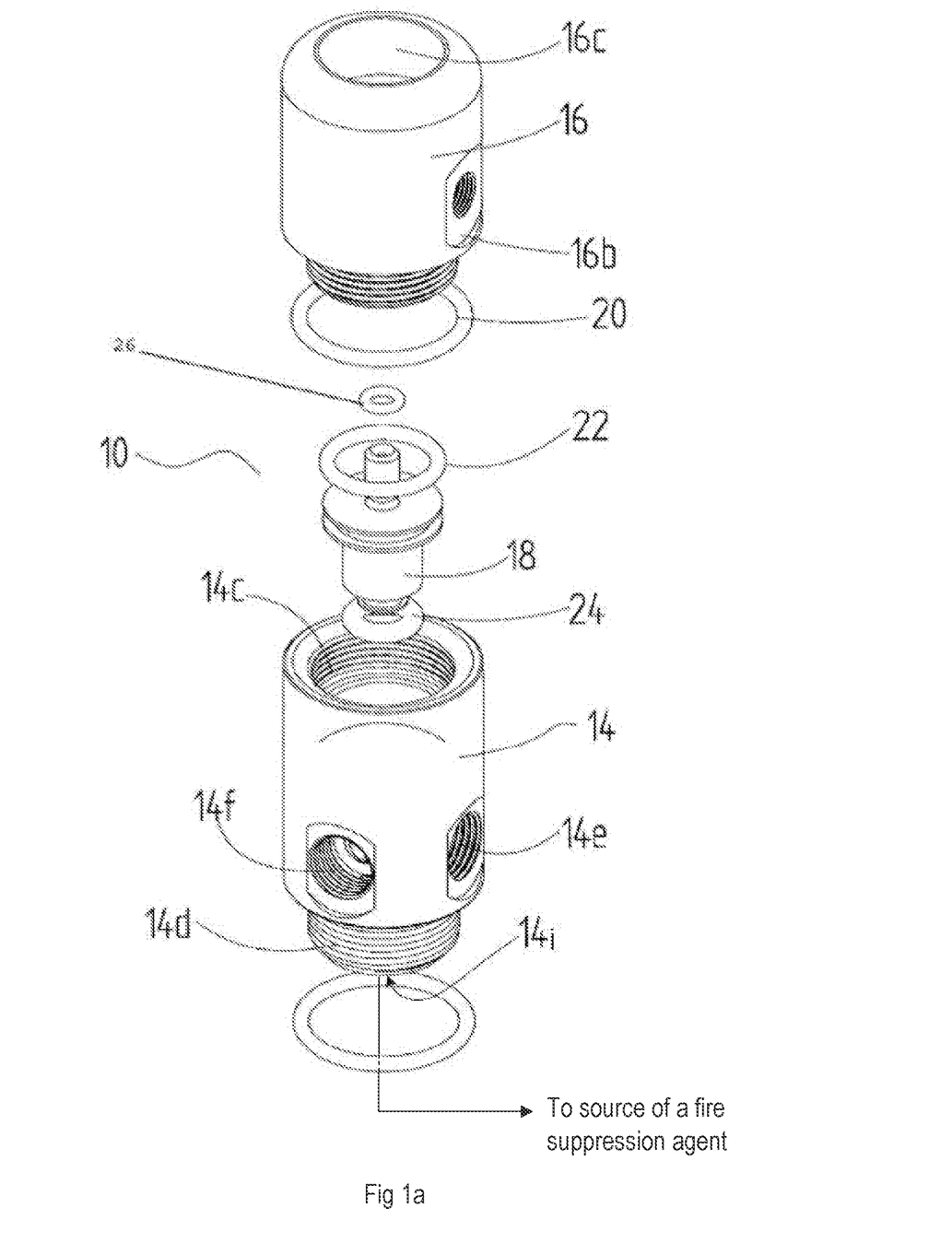
FIGS. 1a and 1b show an exploded view of a first and a second embodiment of the invention respectively.
Figure 1B:
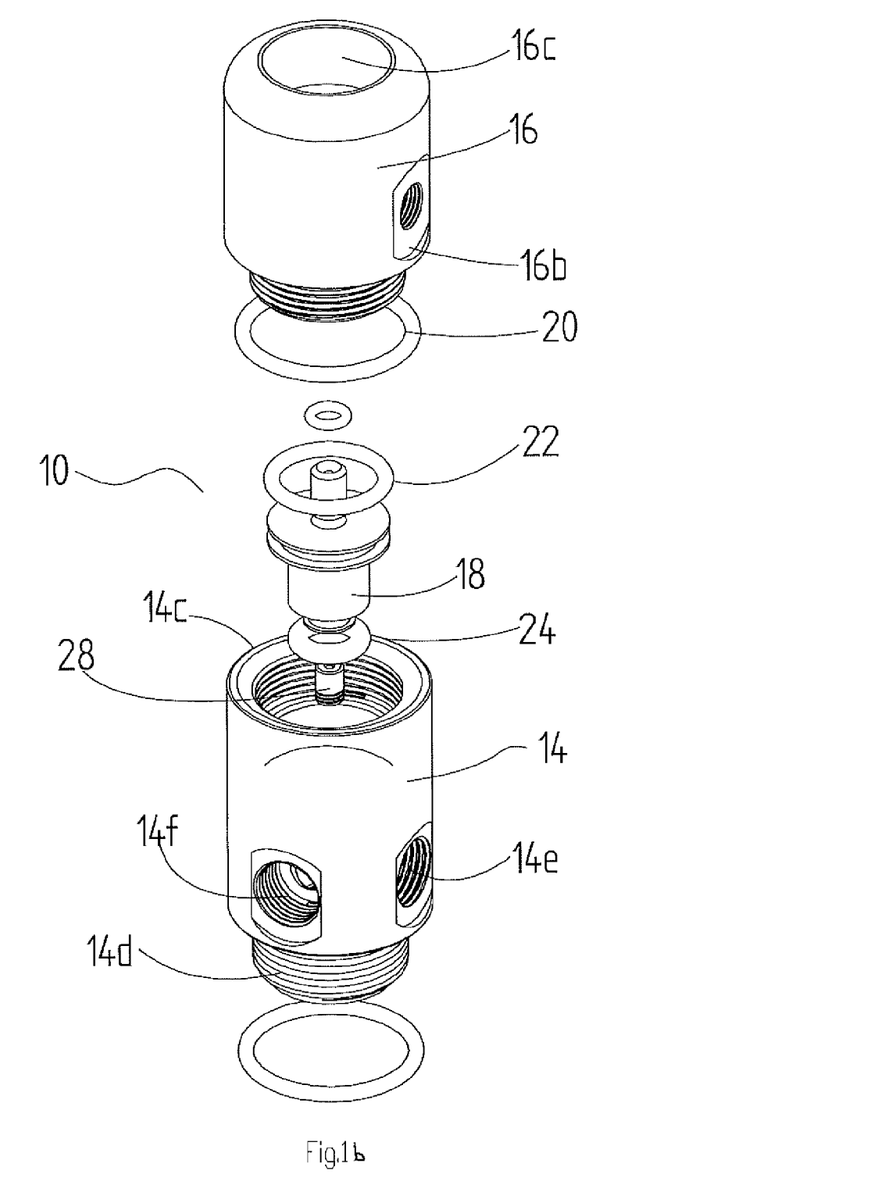
Figure 2:
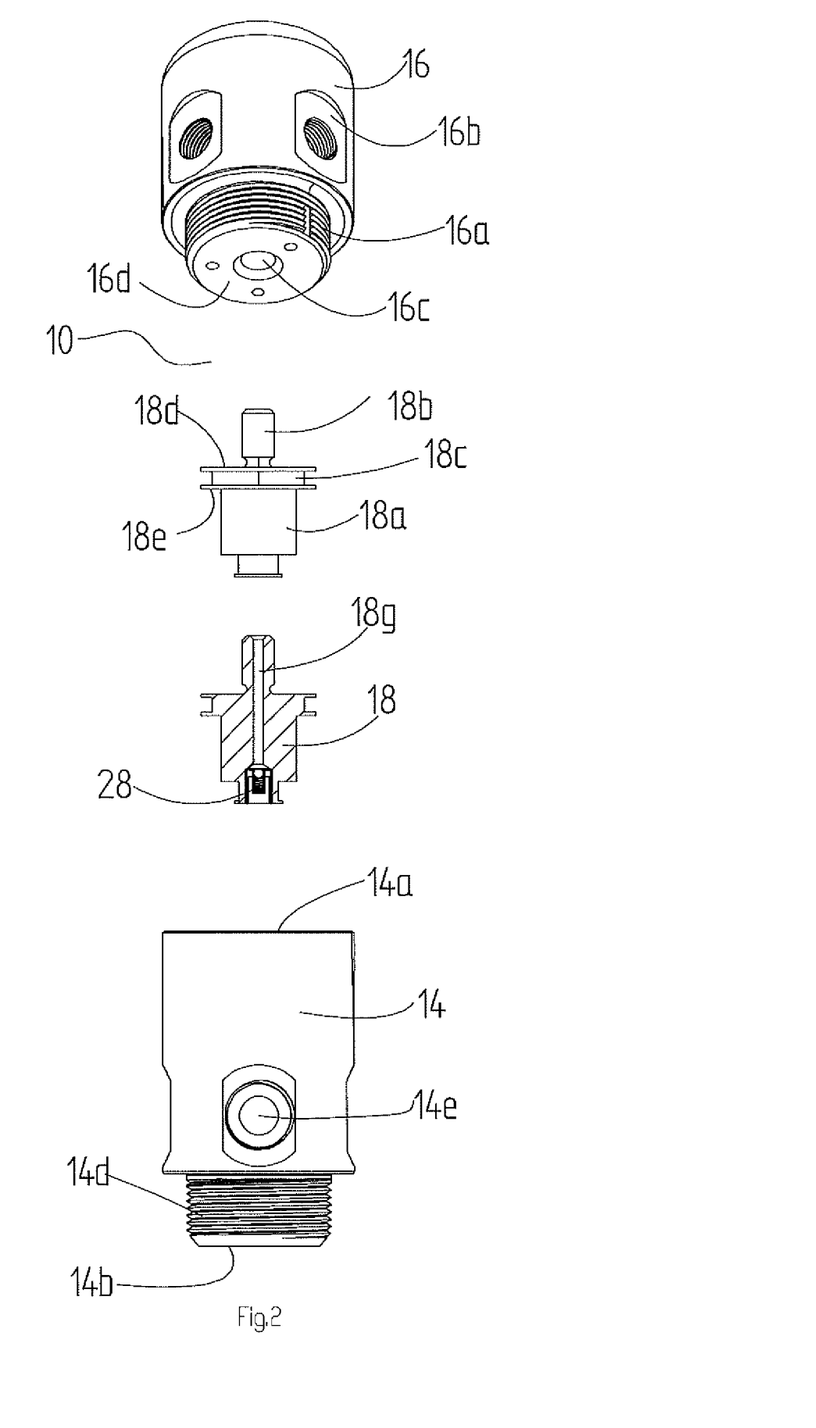
FIG. 2 shows an exploded view of the body and piston of the second embodiment of the invention shown in FIG. 1b.
Figure 3:
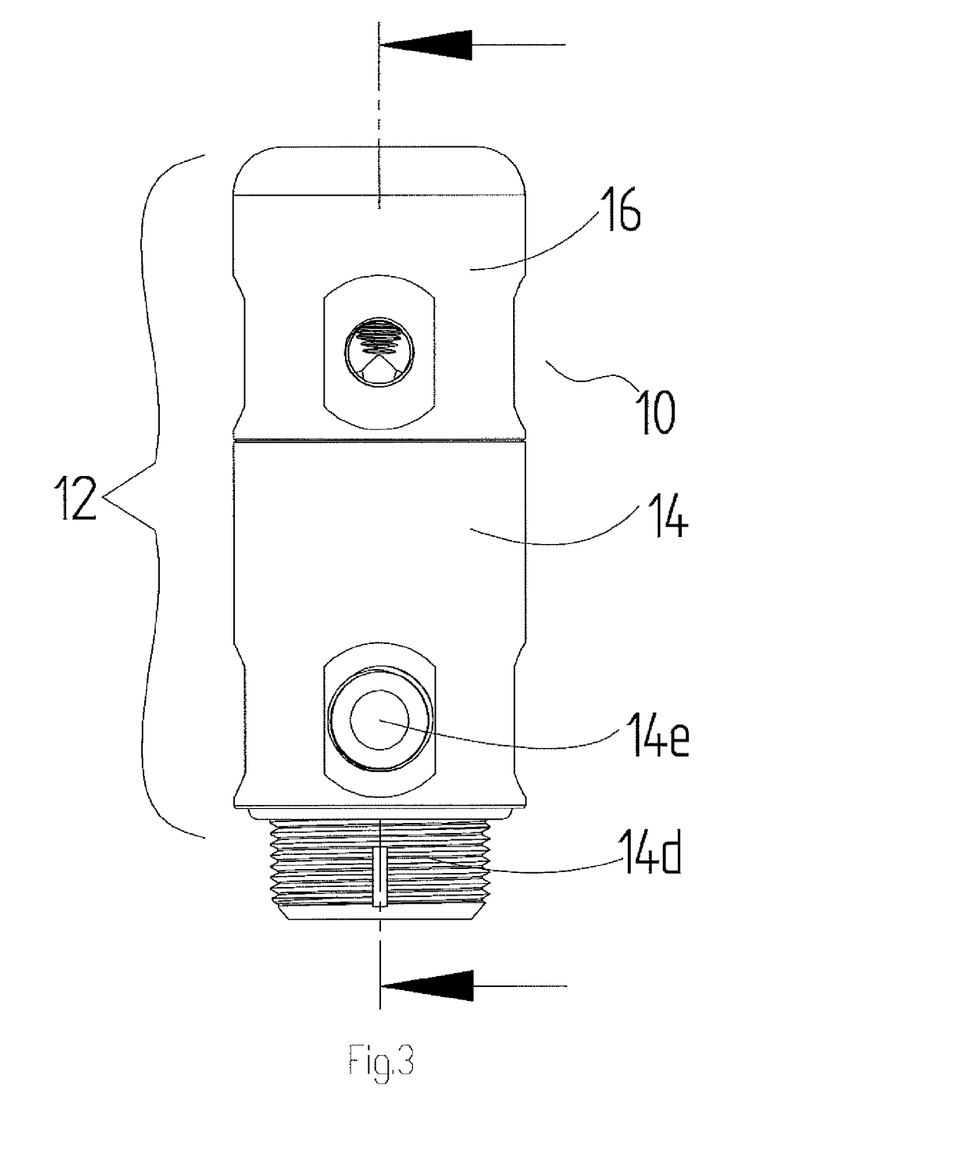
FIG. 3 shows an external view of either the first or second embodiment of the invention.
Figure 4:
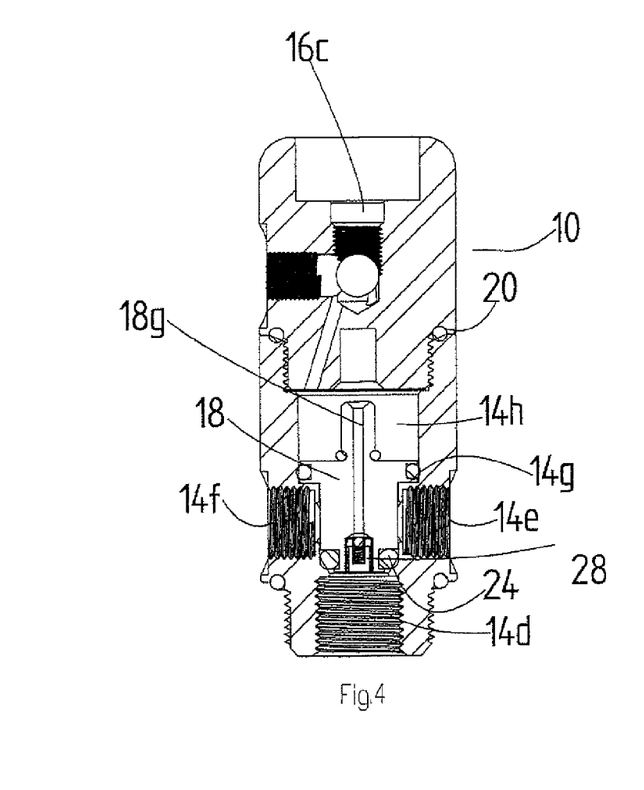
FIG. 4 shows a cross-section through the second embodiment of the invention with the piston in its first axial position.
Figure 5:
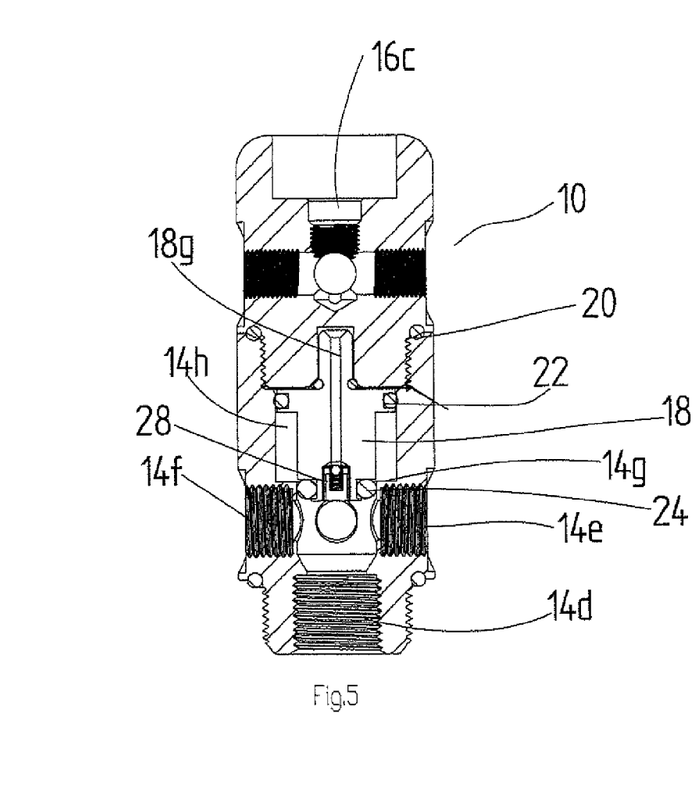
FIG. 5 shows a cross-section through the second embodiment of the invention with the piston in its second axial positon.
Figure 6A:
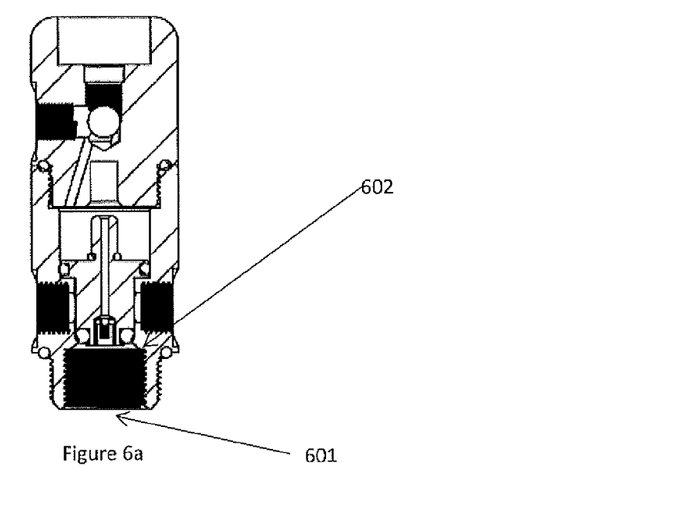
FIGS. 6a and 6b show cross-sections of a third embodiment of the invention with a larger diameter bottom opening.
Figure 6B:
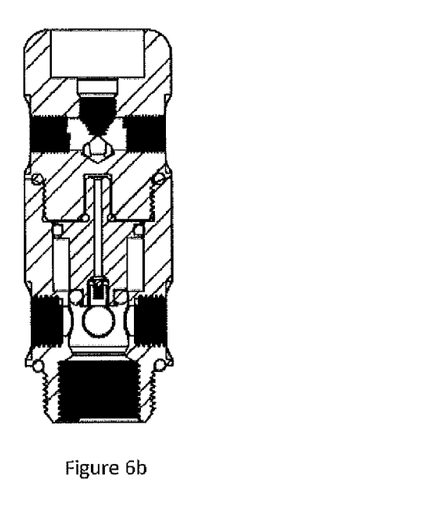

FIGS. 6a and 6b exemplify a third embodiment of the invention wherein the valve opening (601) is of greater diameter than in previous embodiments of the invention. Thus the ratio of the inner diameter of the valve opening (601) to the outer diameter of the valve opening is preferably 50:100 to 80:100, preferably 65:100 to 75:100, most preferably 70:100 to 75:100.

FIGS. 6a and 6b also exemplify a further advantageous feature of a chamfer (602) inside of the valve opening (601) distal to a fire suppression agent source at an angle towards the axis of the valve of preferably 30-70, more preferably 40-65, most preferably 45-60 degrees. The chamfer directs the fire suppression medium towards openings 14e, 14f and 14i. The chamfer preferably has a depth of 1-3 mm, more preferably 1.5-2 mm. The surface roughness Ra of the chamfer may be 2-8 microns (RMS).

The benefits of the chamfer are apparent with or without the enlarged valve opening (601) and thus the chamfer may be used in combination with the enlarged valve opening (601) or not. Furthermore the additional above-mentioned features of the third embodiment of the invention can be combined with the features of the first embodiment of the invention rather than the second embodiment of the invention as shown in FIGS. 6a and 6b.

In use, the automatic valve 10 is connected to an air source (not shown) delivered by a heat sensitive plastic tube to the connector into the second part 16 of the body 12. When the air source is activated, air is introduced through the axial air port 16c and urged against the abutment surface 18d and secondary shaft 18b of the piston 18 to drive the piston 18 downwards into its lowermost axial position with respect to the body 12. In its lowermost axial position the piston 18 blocks the valve openings 14e, 14f, 14i of the first part 14 of the body 12. When the air source is deactivated for any reason, the piston 26 is no longer urged against the valve openings 14d, 14e, 14i and the pressure of the fire suppression agent within the system provides a greater pressure differential between the first 14 and second 16 parts of the body 12 such that the piston 18 is urged upwardly by the pressure of the fire suppression medium thus exposing the valve openings 14e, 14f, 14i and enabling fire suppression agent to flow through the valve 10.

The foregoing description of the invention is an example only and is not intended to limit the scope of the claims in any way. It will be appreciated that the foregoing description is just one way of putting the invention into effect.

The invention claimed is:

1. An automatic valve and a source of a fire suppression agent, the automatic valve comprising a valve body, a piston and a first valve opening, wherein the body comprises a first part for receiving the piston therein and a second part, the second part comprising a connector for connecting the body to an air source providing pneumatic pressure, wherein the body is configured to receive the piston axially therein, wherein the piston is movable within the body between a first axial position in which the piston is configured to seal the first valve opening and a second axial position, wherein the valve body is connected to a source of a fire suppression agent comprising a fire suppression agent at a fire suppression agent pressure, and wherein the piston is moveable within the body to a first axial position when the fire suppression agent pressure is less than the pneumatic pressure, and wherein the piston is configured to be withdrawn from the first valve opening only when the fire suppression agent pressure is greater than the pneumatic pressure such that the fire suppression agent can enter the valve body through the first valve opening.

2. An automatic valve and a source of a fire suppression agent according to claim 1, wherein the piston comprises a channel longitudinally therethrough and a check valve positioned within the channel such that a fluid can enter the check valve in a first longitudinal direction but not in a second longitudinal direction.

3. An automatic valve and a source of a fire suppression agent according to claim 2, wherein the channel has a diameter of 2 mm or greater and a channel opening having a diameter greater than 2 mm to receive the check valve.

4. An automatic valve and a source of a fire suppression agent according to claim 1, wherein the first part comprises a first threaded portion and the second part comprises a second threaded portion co-operable with the first threaded portion.

5. An automatic valve and a source of a fire suppression agent according to claim 4, wherein the first threaded portion defines a male thread and the second threaded portion defines a female thread.

6. An automatic valve and a source of a fire suppression agent according to claim 1, wherein the first part of the body defines a cylindrical chamber.

7. An automatic valve and a source of a fire suppression agent according to claim 1, wherein the second part of the body defines an attachment interface co-operable with a tool.

8. An automatic valve and a source of a fire suppression agent according to claim 7, wherein the piston comprises first and second abutment surfaces engageable with the body to constrain axial movement of the piston.

9. An automatic valve and a source of a fire suppression agent according to claim 8, wherein the second part of the body further comprises a third abutment surface engageable with the first abutment surface of the piston when the piston is in the second axial position.

10. An automatic valve and a source of a fire suppression agent according to claim 8, wherein the piston further comprises an annular recess between the first and second abutment surfaces, the annular recess configured to receive an annular seal.

11. An automatic valve and a source of a fire suppression agent according to claim 10 further comprising a first seal received in the annular recess of the piston configured to provide a seal between the piston and the first part of the body, a second seal received by a shaft of the piston configured to provide a seal between the second abutment surface of the piston and the fourth abutment surface of the first part of the body and a third seal between the first part of the body and the second part of the body configured to provide a seal therebetween.

12. An automatic valve and a source of a fire suppression agent according to claim 1, wherein the valve body comprises a first air connector aligned axially therewith and configured for connection with an air source.

13. An automatic valve and a source of a fire suppression agent according to claim 12, wherein the valve body further comprises a second air connector aligned perpendicular to the first air connector and configured for connection with a further automatic valve.

14. An automatic valve and a source of a fire suppression agent according to claim 1, wherein the first part comprises the first valve opening, wherein the first valve opening has an inner and outer diameter, and wherein the ratio of the inner diameter of the first valve opening to the outer diameter of the first valve opening is 50:100 to 80:100.

15. An automatic valve and a source of a fire suppression agent according to claim 14, wherein the first valve opening further comprises a chamfer inside of the first valve opening distal to the fire suppression agent source, and wherein the chamfer adopts an angle towards the axis of the valve of 30-70 degrees.

16. A fire suppression system comprising at least one automatic valve and a source of a fire suppression agent according to claim 1, a temperature sensitive detection means for detecting the presence of a fire or an elevated temperature, a pneumatic air source providing the pneumatic pressure for maintaining each of the one or more automatic valves in a normal operating condition, wherein detection of a fire or elevated temperature relative to ambient temperature by the temperature sensitive detection means automatically causes the pneumatic pressure to the one or more automatic valves to be removed and removal of the pneumatic pressure enables the fire suppression agent from the fire suppression agent source to enter the one or more automatic valves through the first valve opening and disperse from the one or more automatic valves through a second valve opening.

* * * * *